United States Patent [19]
Bedwell

[11] 3,743,023
[45] July 3, 1973

[54] CONTROL FOR GROUND TOOLS OF FARM IMPLEMENTS

[75] Inventor: Thomas Albert Bedwell, Logan, Utah
[73] Assignee: Hesston Corporation, Hesston, Kans.
[22] Filed: Oct. 7, 1971
[21] Appl. No.: 187,322

[52] U.S. Cl. .................................. 171/5, 56/208
[51] Int. Cl. .................................. A01d 17/00
[58] Field of Search ............... 171/5, 44, 140, 141, 171/144; 56/208, 210, 10.9, 11.4; 172/470

[56] References Cited
UNITED STATES PATENTS
| | | | |
|---|---|---|---|
| 2,906,077 | 9/1959 | Hale et al. | 172/470 |
| 2,973,043 | 2/1961 | Elfes | 172/470 |
| 3,349,747 | 10/1967 | Vande Wiele | 56/208 |
| 2,537,198 | 1/1951 | Wetzel et al. | 171/5 |

*Primary Examiner*—Antonio F. Guida
*Attorney*—Schmidt, Johnson, Hovey & Williams

[57] ABSTRACT

A control for farm implements which provides the alternative of raising and lowering a pair of the ground-engaging tools as a unit or individually and relative to each other. Each tool is pivotally coupled with a corresponding shaft having a power means releasably connected thereto for the raising or lowering of the tool by rocking its shaft. A removable cross pin is provided for interconnecting the shafts to cause the latter to move in unison as they are rocked by either of the power means. A graduated instrument is pivotally coupled with one of the shafts for indicating the extent of ground penetration of one or both of the tools.

10 Claims, 4 Drawing Figures

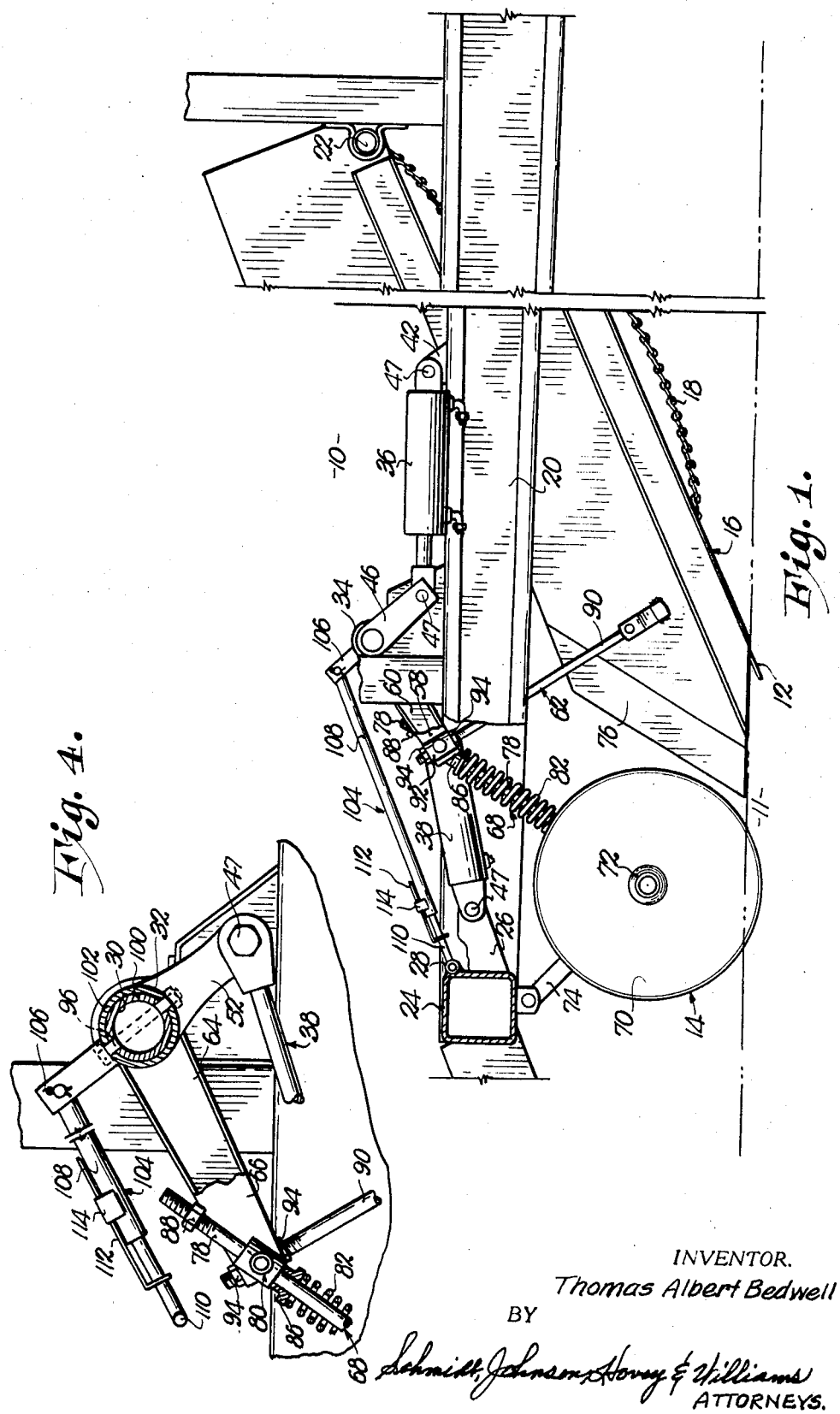

PATENTED JUL 3 1973

INVENTOR.
Thomas Albert Bedwell
BY

Schmidt, Johnson, Hovey & Williams
ATTORNEYS.

CONTROL FOR GROUND TOOLS OF FARM IMPLEMENTS

This invention has to do with controlling the raising and lowering of a pair of ground-engaging tools, e.g., the digging blades and one or more rolling colters of a farm implement such as a potato harvester. The ground conditions in which a potato harvester operates vary greatly, both in soil texture and the amount of rocks, stumps and other foreign materials therein, necessitating the need for frequently adjusting or changing the extent to which the tools penetrate the ground. Furthermore, whereas the colters and the digging blades are normally controlled separately, the aforementioned variables oftentimes dictate that the colters and the blades be raised and lowered as a unit. Normally, the potato harvester is originally equipped with a power means for controlling each set of tools, thus creating the need for a simple and relatively inexpensive way of unifying the controls in the field without major rebuilding or modification. The present invention meets this need and, in addition, provides a simple, improved and more positive graduated instrument incorporated with the raising and lowering structure and operable in direct relation to depth for indicating the extent to which the tools are penetrating the ground. The depth at which the potatoes are in the ground is the primary factory in determining the extent to which the blades are to be set into the ground. The colters are provided to cut the vines and other trash just ahead of the digger blades.

It is, therefore, an important object of the present invention to provide a control in which the raising and lowering of a pair of ground-engaging tools may be controlled either as a unit or may be easily and quickly made capable of adjustment independently of each other.

It is a further important object of the invention to provide relatively simple and inexpensive means for converting the control from one in which the tools are separately and independently raised and lowered to a control which permits unitary operation.

It is a still further object of my invention to provide a compact and simple control having the flexibility of operating under either one of the two modes without unduly limiting the operation of the total harvester.

It is a further important object of the present invention to provide a device or instrument incorporated as a part of the control which will indicate the extent of ground penetration of one or both of the tools.

In the drawings:

FIG. 1 is a fragmentary, side elevational view of the generally forward portion of a potato harvester showing a ground-engaging colter and a ground-engaging blade with their respective raising and lowering structures, parts being broken away for clarity;

FIG. 4 is an enlarged, fragmentary, detailed view taken along line 4—4 of FIG. 2.

Figure 3:
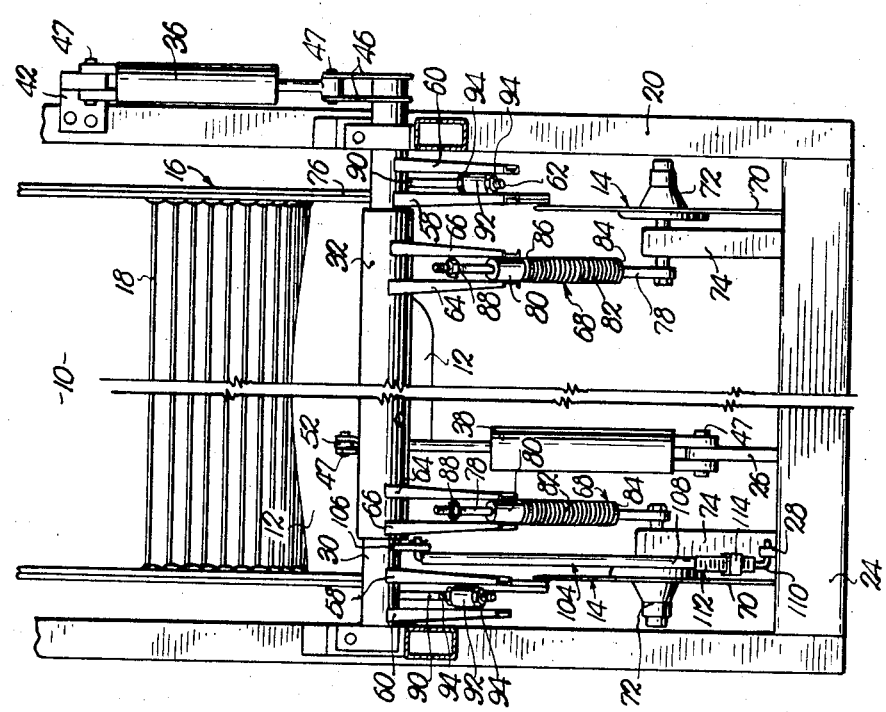
FIG. 3 is a fragmentary, plan view; again showing the essentially forward portion of the harvester similar to that shown in FIG. 2.
Figure 2:
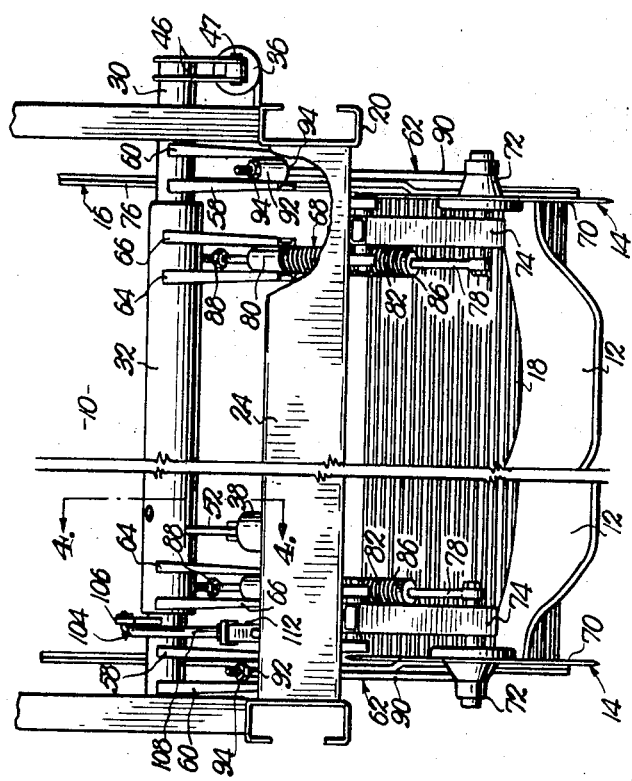
FIG. 2 is a fragmentary, front elevational view thereof, a frame portion of the harvester being broken away for clarity.

Referring initially to FIG. 1 of the drawings, a farm implement such as a potato harvester, broadly designated by the numeral 10, is provided with a pair of ground-engaging tools 11 in the nature of digging blades 12 and rolling colters 14. A vertically swingable, rearwardly and upwardly inclined conveyor 16 provided with an endless carrier chain 18, supports blades 12 and receives the potatoes from the latter for subsequent delivery and deposit into a transport vehicle (not shown). Blades 12 are inclined at essentially the same angle as conveyor 16 and extend transversely across the lower front edge of the latter.

A main frame 20 pivotally carries conveyor 16 for rotation about a horizontal shaft and bearing assembly 22 positioned transversely to the path of travel of harvester 10. Frame 20 includes a tubular cross member 24 at its generally forwardmost end and parallel to assembly 22. Telescoping rock shafts 30 and 32 are carried on main frame 20 intermediate and parallel to assembly 22 and cross member by bearings 34.

Rock shafts 30 and 32 are operably connected with power means in the nature of fluid pressure piston and cylinder assemblies 36 and 38 respectively. Connecting pins 47 releasably attach cylinder 36 to ear 42 of frame 20 and rearwardly and downwardly extending cranks 46 of shaft 30. Cylinder 38 is similarly releasably attached, by the use of pins 47, to a rearwardly extending bracket 26 affixed to member 24 and crank 52 permanently affixed to shaft 32.

Inner rocker arms 58 and outer rocket arms 60 are rigidly carried by shaft 30, and linkages 62 pivotally connect arms 58 and 60 with conveyor 16. Each linkage 62 comprises a link 90 pivotally connected at its lower end to side panel 76 and its upper end adjustably carried by threaded nuts 94 and trunnion 92, the latter being held by its respective inner arm 58 and outer arm 60.

Likewise, inner rocker arms 64 and outer rocker arms 66 are attached to the shaft 32 and each pair is provided with a pivotal spring-tensioned linkage 68 coupled to the corresponding colter 14. Each linkage 68 includes a threaded rod 78 attached at its lower end to assembly 72 and having its upper end slidably engaging a trunnion 80 which is held by its respective inner arm 64 and outer arm 66. A compression spring 82 carried by rod 78 is interposed intermediate assembly 73 and trunnion 80, being maintained in position at its lower end by a flanged collar 84 affixed to rod 78 and by a shiftable, annular flanged collar 86 between its upper end and trunnion 80. A threaded nut 88 at the upper end of rod 78 limits the movement of trunnion 80 relative to rod 78 when structure 56 is activated.

Each colter 14 comprises an upright vertically oriented disc 70 journaled to a spindle assembly 72 for rotation about a horizontal axis which is transverse to the direction of travel of the harvester 10. Pull arms 74 swingably attached to cross member 24, position colters 14 ahead of blades 12 and disposed either to the inside or outside of side panels 76 of conveyor 16.

Releasable means in the nature of a cross pin 96 is provided to be removably inserted through opposed holes in walls 100 and 102 of shafts 30 and 32 respectively. When pin 96 is thus in place, shafts 30 and 32 operate as a unit when either of the cylinders 36 or 38 is actuated.

A tool height indicator in the nature of extensible member 104 is operably coupled between shaft 30 and cross member 24 by means of ear 106 and tubular bracket 28 respectively. Member 104 is provided with a pair of relatively shiftable elements in the nature of an elongated tube 108 and a rod 110, rod 110 telescoping within tube 108. A calibrated scale 112 affixed to rod 110 slidably cooperates with a corresponding sight gauge 114 affixed to tube 108.

In operation, harvester 10 is normally equipped with only the one piston and cylinder assembly 36 for controlling the raising and lower of conveyor 16, with its blades 12, and the colters 14. This unit action is accomplished by the insertion of cross pin 96 through walls 100 and 102 of shafts 30 and 32, thereby interconnecting the same so that the rocking action of shaft 30, caused by assembly 36, is transmitted to shaft 32. The rocking of shafts 30 and 32 by cylinder 36 causes the tools 11 to be raised and lowered uniformly and simultaneously. When cylinder assembly 36 is extended, rock shafts 30 and 32 turn in a clockwise direction when viewing FIG. 1, causing trunnions 80 and 92, carried by arms 58, 60, 64 and 66 respectively, to engage nuts 88 and 94 and exert an upward lifting force on rods 78 and links 90, thereby raising conveyor 16 and colters 14. If cylinder 36 is extended far enough, conveyor 16 and colters 14 will clear the ground. Conversely, the retraction of cylinder 36 will cause shafts 30 and 32 to turn in a counterclockwise direction forcing tools 11 into the ground.

The yieldable nature of each linkage 68 with its spring 82 and the slidable engagement of rod 78 with trunnion 80 permit the colter 14 to independently yield or raise should the disc 70 encounter rocks, stumps, or the like, thereby avoiding damage to the colter 14. The downwardly exerted pressure of trunnion 80 on collar 86 and spring 82 biases colter 14 in its normally downward ground engaging position.

In certain instances when it is desired that ground engaging tools 11 not be controlled as a unit, such as where there are few vines and the colters 14 are not always needed, the auxiliary cylinder 38 may be releasably installed between bracket 26 and crank 52 for rocking shaft 32 independently of shaft 30. It is necessary to remove pin 96 from its intersecting position relative to shafts 30 and 32 whenever cylinder 38 is to be used thereby permitting the shafts 30 and 32 to shift relative to one another at any time one or the other of cylinders 36 or 38 is activated.

If the harvester is to be operated in a field in which the conditions are such that independent control of the tools is not required, pin 96 is again inserted through shafts 30 and 32 as previously described, thereby interlocking them. Whereas it is desirable that the connection between the cylinder 38 and shaft 32 be released by removing pin 47, an alternative would be the replumbing of the hydraulic system (not shown) in order to operate the two cylinders 36 and 38 in parallel through the use of a single control valve (not shown). It is to be understood that while this is certainly another way of combining the raising and lowering of the tools 11, the ideal method would be to actually remove the cylinder 38 and insert cross pin 96 through shafts 30 and 32.

The extent to which the tools 11 penetrate the ground is important. If blades 12 are too shallow, they cut the potatoes rather than bring them up to the chain 18 of conveyor 16; and, if the blades 12 are set too deep, an excess amount of dirt is brought up which is unnecessary and places more load on harvester 10. For these reasons, the tool height indicator is operably coupled with rock shaft 30 in such a manner that sight gauge 114 moves relative to scale 112 as shaft 30 moves. While the sight gauge 114 and tube 108 are controlled solely by the action of shaft 30, the member 104 also indicates the engagement of colters 14 with the ground as long as pin 96 is in use and the tools 11 are operating as a unit. When the tools 11 are separated, then, of course, member 104 would function only to gauge the depth of blades 12.

Member 104 indicates the extent of penetration of the ground engaging tools 11 by responding to the rocking of shaft 30 relative to main frame 20. Tube 108 shifts with the rocking of shaft 30 while rod 110 remains fixed by virtue of its attachment to cross member 24, scale 112 and gauge 114 thus indicating the relative telescoping of tube 108 and rod 110 which corresponds to the relative position of conveyor 16 with main frame 20.

Heretofore the colters 14 have had to be controlled separately, even when there was no functional need to, strictly because their adaptation to the harvester 10 was such that the controls could not be easily and quickly synchronized with those of the conveyor 16 and put under the influence of a single power means. The control hereinabove described permits the flexibility of either controlling the ground engagement of the colters 14 independently of conveyor 16 without the use of extra linkage or other mechanism, except for a single cylinder 38, or synchronizing such ground engagement with the conveyor 16.

Having thus described the invention, what is claimed as new and desired to be secured by Letters Patent is:

1. In a farm implement:
   a pair of ground-engaging tools;
   a pair of relatively rotatable rock shafts housed one within the other for oscillation about a common axis;
   a power means operably connected with each shaft respectively for rocking the same;
   structure for each tool respectively operably coupling the same with its corresponding shaft to permit separate raising and lowering of the tools by rocking a selected one of the shafts relative to the other through its power means; and
   means for releasably interconnecting the shafts for rocking thereof in unison when the shafts are interconnected to effect raising and lowering of said tools as a unit when either or both of said power means is actuated.

2. In a farm implement as claimed in claim 1 wherein each structure includes a rocker arm rigid to the corresponding shaft and linkage pivotally interconnecting the arm with the corresponding tool.

3. In a farm implement as claimed in claim 1 wherein each power means is a fluid pressure piston and cylinder assembly.

4. In a farm implement as claimed in claim 1 wherein the operable connection of one of said power means with the corresponding shaft is releasable for rendering said one power means ineffective while the shafts are interconnected by said releasable means.

5. In a farm implement as claimed in claim 1 wherein said releasable means is a removable cross pin intersecting the shafts when the latter are interconnected by the pin.

6. In a farm implement as claimed in claim 1 wherein is provided a tool height indicator operably coupled with on of said shafts.

7. In a farm implement as claimed in claim 6 wherein said indicator is an extensible member pivotally coupled with said one shaft and provided with a pair of relatively shiftable elements, there being a device on the member for indicating the relative positions of the elements.

8. In a farm implement as claimed in claim 1 wherein one of said tools is a potato digging blade, there being a vertically swingable potato conveyor disposed to receive potatoes dug by said blade, one of said structures operably coupling one of the shafts with the conveyor, the blade being mounted on the conveyor for swinging movement therewith.

9. In a farm implement as claimed in claim 8 wherein the other of said tools is a rolling colter ahead of said blade.

10. In a farm implement as claimed in claim 1 wherein one of said tools is a rolling colter and means is provided to pull said colter, said pulling means mounting the colter for vertical swinging movement about a horizontal axis.

* * * * *